United States Patent [19]

Oyama et al.

[11] Patent Number: 5,099,329
[45] Date of Patent: Mar. 24, 1992

[54] NOISE REDUCTION METHOD AND DEVICE FOR IMAGE SIGNAL

[75] Inventors: Koichi Oyama; Xiaohong Sun, both of Tokyo, Japan

[73] Assignee: Graphic Communication Tech., Ltd., Tokyo, Japan

[21] Appl. No.: 686,164

[22] Filed: Apr. 16, 1991

[30] Foreign Application Priority Data

Apr. 17, 1990 [JP] Japan .................................. 2-101417
Apr. 26, 1990 [JP] Japan .................................. 2-110959
Jan. 9, 1991 [JP] Japan .................................. 3-12751

[51] Int. Cl.$^5$ .............................................. H04N 5/213
[52] U.S. Cl. ................................... 358/167; 358/36
[58] Field of Search .................. 358/167, 166, 36, 37, 358/168, 177, 155, 156, 157

[56] References Cited

U.S. PATENT DOCUMENTS

| | | | |
|---|---|---|---|
| 4,249,210 | 2/1981 | Storey | 358/167 |
| 4,539,594 | 9/1985 | Illetschko | 358/167 |
| 4,549,213 | 10/1985 | Illetschko | 358/167 |
| 4,639,784 | 1/1987 | Fling | 358/167 |
| 4,652,907 | 3/1987 | Fling | 358/36 |
| 4,689,671 | 8/1987 | Ohki | 358/167 |
| 4,796,088 | 1/1989 | Nishimura | 358/167 |
| 4,833,537 | 5/1989 | Takeuchi | 358/167 |
| 5,025,316 | 6/1991 | Darby | 358/167 |

*Primary Examiner*—John W. Shepperd
*Assistant Examiner*—Sherrie Hsia
*Attorney, Agent, or Firm*—Iandiorio & Dingman

[57] ABSTRACT

The first difference signal between the current and previous frame signals is obtained by the subtracter pixel by pixel and supplied to both the line memory and the average value calculation circuit. The average value calculation circuit calculates the average value for at least one line of the first difference signal which relates to only pixels with smaller absolute of the difference value than the present threshold. If the pixels which have absolute values smaller than the threshold, are less than the present number, the average value is set 0. Large values of the first difference caused by motion of the target are excluded and not treated as the flicker noise. The second difference signal is transformed by the non-linear circuit according to predetermined characteristics and supplied to the adder. The previous frame signal is supplied to the adder at the same time by delaying the signal through the line memory. The adder adds the output signals of the non-linear circuit and the line memory at each same pixel, and outputs to the output port and the frame memory. In a second embodiment the noise reduction device may include a noise reduction circuit and evaluation calculation circuit to decrease signal distortion for more natural image quality. In a third embodiment the noise reduction device may include a discrimination circuit and selectively switchable multipliers to adjust factors to optimize noise reduction or distortion reduction based on human visual sensitivity.

5 Claims, 7 Drawing Sheets

NOISE REDUCTION METHOD AND DEVICE FOR IMAGE SIGNAL

BACKGROUND OF THE INVENTION

1. Field of the Invention

This invention is related to a digital noise reduction device for digital image processing, and actually intends to provide a noise-reduction filter as preprocessing with interframe coding based digital video codes for better image fidelity and quality.

2. Prior Art

First Prior Art

FIG. 7 is a block diagram showing an example of the refilter wellknown. A subtracter 2 subtracts an previous image signal S5, which is stored in the frame memory 5, from an original image input signal S1, which is input from the input port 1, pixel by pixel. As the result, a difference signal S2 is outputted from the subtracter 2, and supplied to a non-linear circuit 3. The difference signal S2 is transformed according to characteristics of the non-linear circuit 3.

Transformed difference value S3 is supplied to an adder 4, wherein the difference value S3 is added with the previous frame signal S5 which designates a previous frame image from the frame memory 5. The adder 4 outputs a result of addition as an additional signal S4, then this additional signal S4 is outputted from the output port 6, and is also stored into the frame memory 5.

In the above-mentioned operation, for example, the non-linear circuit 3 has characteristics which suppress the amplitude of an input signal by non-linearzation when the absolute value of the amplitude of the input signal is smaller than the preset value V1 as shown FIG. 8. In other words, the input signal S1 includes noise, such as Flicker noise related to fluorescent lights or camera noise, which has generally smaller amplitude than an interframe difference signal. So that, smaller noise signals than the preset value V1 in terms of the absolute amplitude are suppressed through the non-linear circuit 3 as shown in FIG. 8. Therefore, the preset value V1 is usually preset at almost the maximum value of included noise in the input signal S1.

Behavior of noise suppression by the non-linear circuit 3 will be explained by using FIG. 9. In FIG. 9, the solid line expresses the output signal S2 of the subtracter 2 in FIG. 7, which includes the flicker noise ingredient denoted by the dashed line. And, reference A denotes the period of random noise, and B denotes the period of motion of objects, respectively. If the preset value V1 in the non-linear circuit 3 is preset at the larger value than the maximum value like the dashed dotted line, all signals whose absolute amplitude are smaller than V1 are suppressed as noise, including effective signals during B1 period.

Second Prior Art

Pre-filtering methods, that includes motive/static discrimination about the image, have been proposed. An example of them is the method which decides the noise reduction characteristics after discrimination of not only the interframe differences but also neighbor pixels differences for motive/static evaluation. (Japanese Patent Laid-Open Publication No. 1-143583).

In this methods, the interframe absolute differences are used for motive/static discrimination, which consists of the target pixel's interframe absolute difference and the summation of the neighbor pixel's interframe absolute differences. Noise reduction characteristics changes continuously corresponding with the result of discrimination for each pixel.

As another example, the center pixel is pointed to be noise-reduced at first. All interframe absolute differences near the center pixel are compared with given constants, and motive/static discrimination is made based on these comparison. Then if discrimination designates static conditions, noise-reduction value will be increased. However, If discrimination designates motive conditions, noise-reduction value will be decreased. (Japanese Patent Laid-Open Publication No. 2-7773).

Third Prior Art

Next, FIG. 10 is a block diagram showing the construction of an another Prior Art. In FIG. 10, a digitized input image signal S6 is supplied to a subtracter 8 through an input port 7. At this subtracter 8, a frame memory data S10 is supplied from the frame memory 11. So that, an interframe difference S7 is obtained at the subtracter 8 as difference between a previous image and an original input signal. An interframe difference signal S7 is supplied to a multiplier 9, and is multiplied by multiplication coefficient K to obtain a multiplied signal S8. Then the multiplied signal S8 and the frame memory output signal S10 are supplied to the adder 10, and are added. The adder 10 is outputted a output image signal S9 to an output port 12 and the frame memory 11.

In the frame memory 11, one frame of image data is stored. Generally, the multiplication coefficient K at the multiplier 9 is 1 or less, and is usually applied to every pixels by means of some motion detector (not described in the figure) which detects a motion of the image. The coefficient K for the each pixel is different value, and is multiplied in the multiplier 9.

According to the noise reduction device described in the above, in FIG. 7, in the case that the amplitude of an interframe difference signal S2 is smaller than the preset value V1, this signal S2 is suppressed as noise. Therefore this preset value V1 should be as small as possible in order to reconstruct high fidelity of image.

However, in the cases of video-conferences and video-phones as in-house use, most of lights are fluorescent ones, and cheap TV cameras are usually utilized, so that the level of noise which is caused by above-mentioned circumstances, is relatively large. Thus, the preset value V1 has to be set as relatively larger. Consequently, if the difference signal S2 is a normal signal but not noise, such as the signal of period B1 in FIG. 9, is suppressed as noise.

As explained above, in this first prior art using the prefilter technique in FIG. 7, the signal of motion part which has the small difference value of the motion image signal, is not reconstructed with high fidelity, thus the image becomes unnatural, because the effective signals are sometimes suppressed.

According to two examples of the motive/static discrimination techniques described before, these techniques can obtain better results than the motive/static evaluation based on each pixel's interframe difference only. Because the possibility of descrimination-mistakes, in which larger amplitude signals in the static area are discriminated as signals in the motive area, decreases.

However, even if these techniques are adopted, relatively large noises sometimes make the motive/static discrimination mistaken for the supplied image signal. In the first case, for example, when the motive/static evaluation value, $X_{s1} = |X_o| + |X_1| + |X_2| + |X_3| + ..$ . $+|X_n|$ is smaller than the preset threshold or the adaptive threshold changing according to $|X_o|$ and $X_{s1}$, the target pixel is discriminated as a pixel in the static area, where $X_o$ is the target pixel's interframe difference, and $X_1, X_2, \ldots X_n$ are neighbor pixels' interframe differences, respectively.

However, noise which includes higher frequency spectrum makes these difference values $X_1, X_2, X_3, \ldots, X_n$, both positive and negative. Therefore, if absolute summation of them are used for motive/static evaluation, the threshold must be set relatively larger. Consequently a motive signal with a small interframe difference could be discriminated as a signal in the static area, and be redacted as noise, because of too strong noise reduction effect.

As the result, even effective motive signals sometimes suffer from distortion, which brings unnatural artifact such as residual images.

On the other hand, in the second case, when all absolute of interframe differences $X_1, X_2, X_3, \ldots X_n$ of each neighbor pixel, are smaller than the preset threshold, that is, $X_{s2} = \max(|X_1|, |X_2|, \ldots, |X_n|) \times n$ is smaller than the preset threshold, the center point of the target area is discriminated as the pixel in the static area. Therefore, it is necessary for this preset threshold to be set relatively larger in order to suppress higher frequency noise. Consequently this second case has also the same problem as first case.

In the case of the third prior art showing FIG. 10, when the coefficient K is exactly the same as 1, the interframe difference S7 is directly sent to the output port 12 as an output image signal S9. If the input image signal S6 includes noise at this time, the noise is also looked as a part of interframe difference S7 from the stored data in the frame memory 11, and is supplied to the multiplier 9. At the multiplier 9, the noise is multiplied by the coefficient K(=1), then it directly appears at the output port 12. In this case, noise reduction cannot be provided.

When the coefficient K is smaller than 1, a difference in an input image signal S6 appears as the value multiplied by K in the output image signal S9, so that this difference in the input image signal S6 affects the output image signal S9 several frames later only to reconstruct the image with some fidelity.

Therefore the smaller the coefficient K is, the more a random type of signal such as noise is suppressed as noise reduction effect. However even effective difference from the previous frame appears to be reconstructed several frames later with some fidelity, which makes the distortion that trails a tail in the image, called "comet tail". Then the multiplier 9 is operated in order that the coefficient K is set smaller than 1 for almost static image to perform noise reduction effect, and is set 1 or close to 1 for motive image.

In other words, the coefficient K is set only by motion independent of the image brightness.

As the result, when the difference from the previous frame is relatively large, noise reduction effect decrease because the coefficient K is set a value close to 1. On the other hand, the distortion called "comet tail" conspicuously appears according to increase of noise reduction effect.

SUMMARY OF THE INVENTION

Accordingly, it is a purpose of the present invention to provide a noise reduction device capable of effectively using area of the digital image processing to reduce noise of video image signal.

In an aspect of the present invention to provide a noise reduction device including:

a first subtracter means for obtaining a first difference between a current frame signal and a previous frame signal pixel by pixel;

a first line memory means for outputting said first difference with a delay time corresponding to at least one line processing time;

an average value calculation means for calculating an average value of said first difference which is in a preset range, on at least one line of pixels;

a second subtracter means for obtaining a second difference between an output of said first line memory means and an output of said average value calculation means pixel by pixel;

a non-linear means for suppressing said second difference smaller than a preset value;

a second line memory means for outputting said previous frame signal with a delay time to output at same timing with output of said non-linear means;

an adder means for adding an output of said non-linear means and an output of said second line memory means pixel by pixel; and a frame memory means for memorizing an output of said adder means, and for outputting said previous frame signal, which is memorized therein, to said first subtracter means and said second line memory means.

As a result, according to this first aspect of the invention, the average value of the original frame and the previous frame about one line or several lines are calculated pixel by pixel based on the fluorescent light's flicker noise with lower frequency (100 Hz or 120 Hz), because the intensity are almost DC ingredient and does not change along the same scanning line. The smaller interframe difference value after subtraction of the interframe difference by this average value as the flicker noise are used, and the suppression threshold is also set smaller corresponding to smaller by the non-linear circuit.

As it is clarified by these explanation, the non-linear circuit can suppress random noise ingredients only, because the amplitudes of the 2nd. Interframe difference signals are gotten by subtracting the average value of the 1st. Interframe difference signals between the original frame and the previous frame as the flicker noise from the original frame signal. There fore possibility of suppression of effective signals decreases, and fidelity of image reconstruction is improved especially for relatively small motion signals.

In a second aspect of the present invention to provide a noise reduction device including:

a subtracter means for obtaining a first difference between a current frame signal and a previous frame signal pixel by pixel;

a plural pixel memory for obtaining second differences of a target pixel for noise reduction and of neighboring pixels of said target pixel, based on said first difference;

an evaluation value calculation means for calculating absolute values of summation of said first difference and said second differences, as evaluation value for determining a noise reduction characteristic; and a noise reduction means for suppressing noise including said first and second differences of pixels based on said noise reduction characteristic.

In a third aspect of the present invention to provide a noise reduction device including:

a subtracter means for obtaining a first difference between a current frame signal and a previous frame signal pixel by pixel;

first pixel memory means for obtaining second differences of a part of pixels which are a target pixel for noise reduction and neighboring pixels of said target pixel, based on said first difference;

noise reduction means for suppressing noise including said first differences based on an evaluation value for determining a noise reduction characteristic;

second pixel memory means for obtaining noise reduced differences, by said noise reduction means, of rest part of said pixels which are a target pixel for noise reduction and neighboring pixels of said target pixel based on said first difference; and an evaluation value calculation means for calculating absolute values of summation of said noise reduced differences from said second pixel memory means and said first and second differences of at least each neighboring pixel, as said evaluation value for determining said noise reduction characteristic.

As a result, according to these second and third aspects of the invention, the absolute value of the summation of the interframe difference values of the target pixel and its neighbor pixels or the absolute value of the summation of the interframe difference values of neighbor pixels except the target pixel are used for motive/static evaluation. Characteristics of noise reduction is decided based on this evaluation value. And also the interframe difference values after noise reduction are included as values for evaluation value calculation.

By this means, it is possible for the motive/static thresholds about the target pixels for noise reduction to set smaller values, which makes the motive/static evaluation more accurate even for relatively smaller interframe difference signals.

As the threshold for motive/static discrimination about as target pixel can be set smaller, possibility of miss-discrimination based or too strong noise reduction effect, which looks a small interframe difference signal in the motive area as one in the static area, decreases. There fore distortion of effective signals decreases, and brings more natural image quality.

In a forth aspect of the present invention provide a method for reducing noise of image signal, comprising steps of:

obtaining a difference signal between a input image signal which is a current frame signal and a memorized signal which is a previous frame signal pixel by pixel;

obtaining a multiplication coefficient which is smaller than 1, in case of that brightness of image designated by said current frame signal has been changing toward the brighter when said brightness is bright, and in case of that said brightness has been changing toward the darker when said brightness is dark, on the basis of said input image signal and said difference signal, however, obtaining a multiplication coefficient which is less than 1 and is larger than said multiplication coefficient, in case of that said brightness has been changing toward the darker when said brightness is bright, and in case of that said brightness has been changing toward the brighter when said brightness is dark, on the basis of said input image signal and said difference signal;

obtaining a multiple signal by multiplying said difference signal by said multiplication coeficient;

obtaining summation of said memorized signal and said multiple signal;

then storing said summation as a memorized signal for input image signal of next frame, and outputting said summation as final output image signal at the same time.

In a fifth aspect of the present invention provide a noise reduction device including:

a subtracter means for obtaining a difference between a current frame signal and a previous frame signal;

discriminator means for discriminating that said difference is multiplied a multiplication coefficient which is smaller than 1, in case of that brightness of image designated by said current frame signal has been changing toward the brighter when said brightness is bright, and in case of that said brightness has been changing toward the darker when said brightness is dark, on the basis of said input image signal and said difference signal, however, that said difference is multiplied a multiplication coefficient which is less than 1 and is larger than said multiplication coefficient which is smaller than 1, in case of that said brightness has been changing toward the darker when said brightness is bright, and in case of that said brightness has been changing toward the brighter when said brightness is dark, on the basis of said input image signal and said difference signal;

multiplier means for obtaining a multiply signal by multiplying said difference signal by said multiplication coefficient according to said discriminating;

adder means for obtaining an output image signal by adding said memorized signal and said multiply signal; and frame memory means for storing said output image signal, and for outputting said output image signal memorized therein as said memorized signal for next frame.

As a result, according to these forth and fifth aspects of the invention is based on human visual sensitivity. When human visual sensitivity is low, and high, the coefficient K is set smaller than 1 for higher noise reduction effect and is set close to 1 for higher distortion reduction, respectively.

Human eyes are not so sensitive for distortion called "comet tail" when the frame changes from a bright one to a brighter one. There is the same situation in the case that the frame changes from a dark one to a darker one. On the other hand, human eyes become more sensitive for distortion when the frame changes from a bright one to a dark one or opposite. There fore higher noise reduction effect can be achieved with the minimum distortion by this means.

As the distortion called "comet tail" can be excluded by changing the multiplier coefficient based on human visual sensitivity for brightness level, effective noise reduction becomes available with the minimum distortion.

DESCRIPTION OF THE PREFERRED EMBODIMENT

Hereinafter, embodiments of the present invention will be described by reference to drawings.

First embodiment

Figure 1:
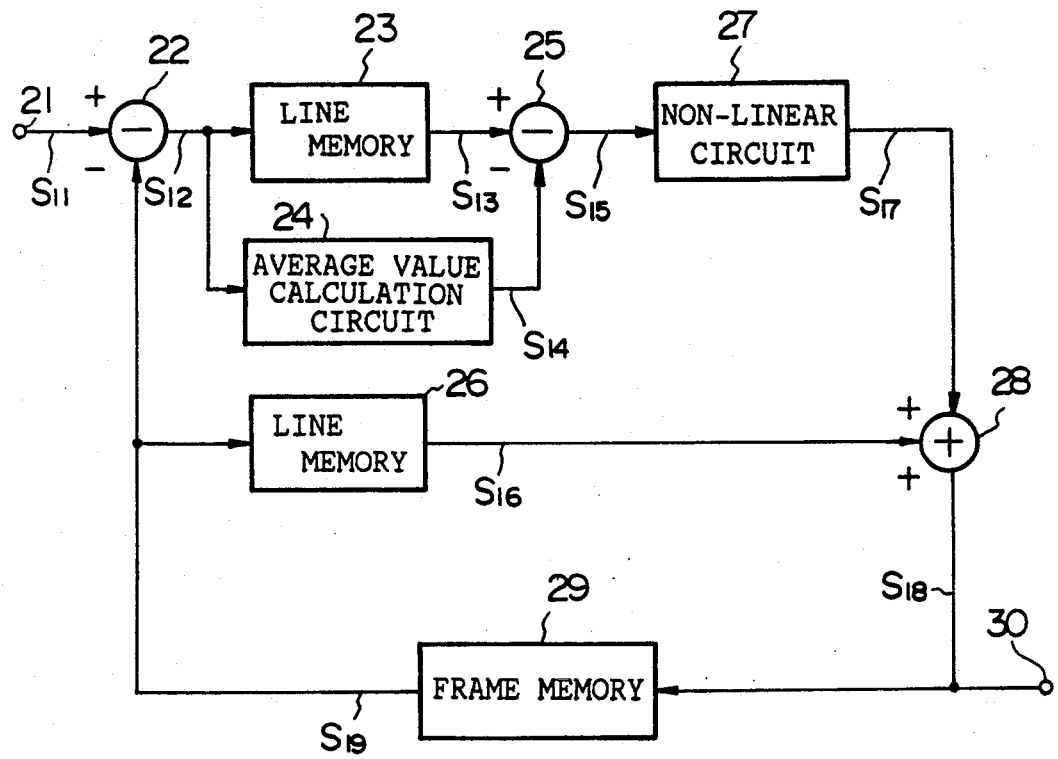
FIG. 1 is a block diagram showing a noise reduction device of the first embodiment.

FIG. 1 is a block diagram showing a noise reduction device of the first embodiment of this invention.

In FIG. 1, the first interframe difference signal S12 between the original frame signal S11 which is input from the input port 21 and the previous frame signal S19 which is output from the frame memory 29 is obtained by the subtractor 22 pixel by pixel. The obtained first interframe difference signal S12 is supplied to both the line memory 23 and the average value calculation circuit 24. The average value calculation circuit 247 calculates the average value for one line or several lines of the first interframe difference signal S12, where the average values are calculated for only pixels with smaller absolute of the interframe difference value than the preset threshold. And, in pixels of one line or several lines, if the pixels which have absolute values smaller than the threshold, are less than the preset number, the average value is set 0. Because the average value calculated by the average calculation circuit 24 is looked as the flicker noise in this invention, and large values of the first interframe difference S12 caused by motion of the target are excluded not to be looked as the flicker noise.

After the average value of the first interframe difference S12 whose absolute values of one or several lines which are smaller than the threshold is calculated by the average value calculation circuit 24 in this manner, the subtracter 25 subtracts the line memory output signal S13 from the line memory 23 by the average value to obtain the second interframe difference signal S15, which is transformed by the non-linear circuit 27 according to predetermined characteristics. The second interframe difference signal S17 is supplied to the adder 28. At the same time, the previous frame signal from the frame memory 29 is delayed through the line memory 26, and the output signal S16 of the line memory 26 is supplied to the adder 28.

Figure 7:
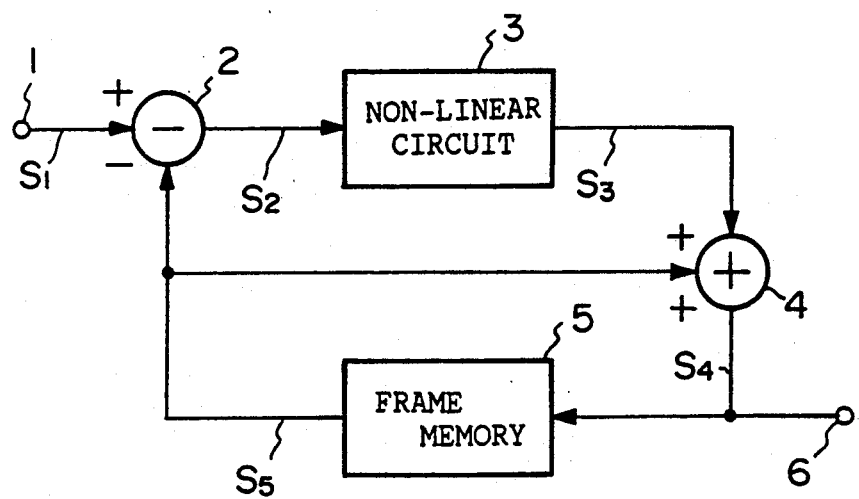
FIG. 7 is a block diagram showing a conventional noise reduction device of the first prior art.
Figure 8:
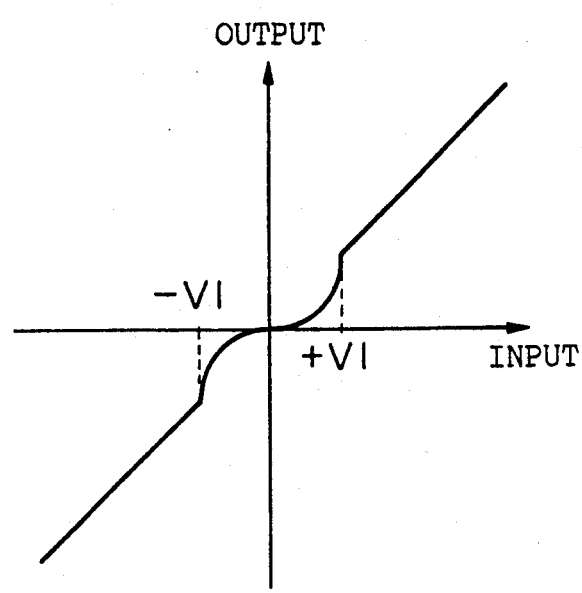
Fig. 8 is an example of input-output characteristic of the non-linear circuit in FIG. 7.

As the delay time of the subtracter 25 and the non-linear circuit 27 is negligible small, the delay time of the line memory 26 correspoonds to that of the line memory 23. Hence the delay time of the frame memory 29 is equivalent to the value which is subtracted the delay time of the line memory 26 or 23 from that of the conventional frame memory 5 (see FIG. 7). Then the adder 28 adds the output signal S17 of the non-linear circuit 27 and the output signal S16 of the line memory 26 at each same pixel.

The added value S18 from the adder 28 is outputted from the output port 30, and is supplied to the frame memory 29 and stored. The above-mentioned operations are repeated.

Figure 9:
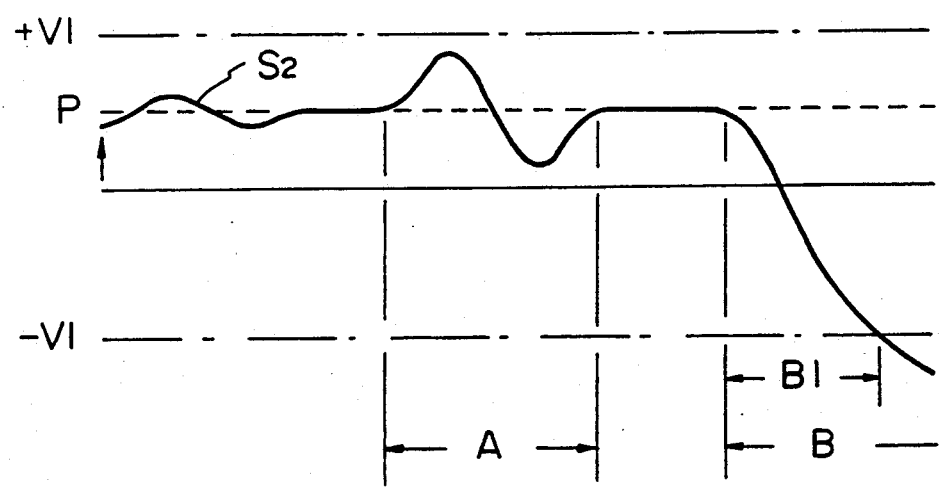
FIG. 9 is a waveform to explain behavior of noise suppression by the non-linear circuit in FIG. 7.

Next, noise suppression will be explained by using FIG. 2, where the signal described by the solid line S15 in FIG. 2, corresponds to the signal S2 in FIG. 9, and the area A, B correspond the area A, B in FIG. 9, respectively.

Figure 2:
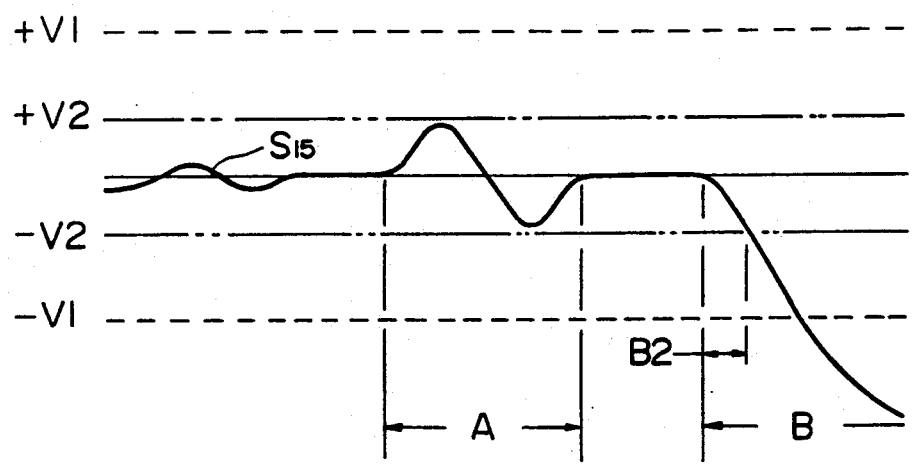
FIG. 2 is a waveform chart to explain the operation about behavior of noise suppression by the non,linear circuit based on FIG. 1.

In FIG. 2, the amplitude of the second interframe difference signal S15, which is supplied to the non-linear circuit 27 (see FIG. 1), is subtracted the average value signal S14 as the flicker noise included in the input signal S11 from the first interframe difference signal S13. Therefore, the amplitude of the signal decreases by the amplitude P of the flicker noise compared with the signal S2 in FIG. 9. As the result, the preset value V2 (double dotted line) for the non-linear circuit 27 can be set smaller than the former preset value V1 (dashed line) corresponding to the maximum wave height value of noise. Then, the effective signal only during the period B2 in the period B cannot be distinguished from noise to be suppressed. However, the situation is improved for less distortion compared with the former case that the effective signal during the period B1 (see FIG. 9) is treated as noise.

Second embodiment

Figure 3:
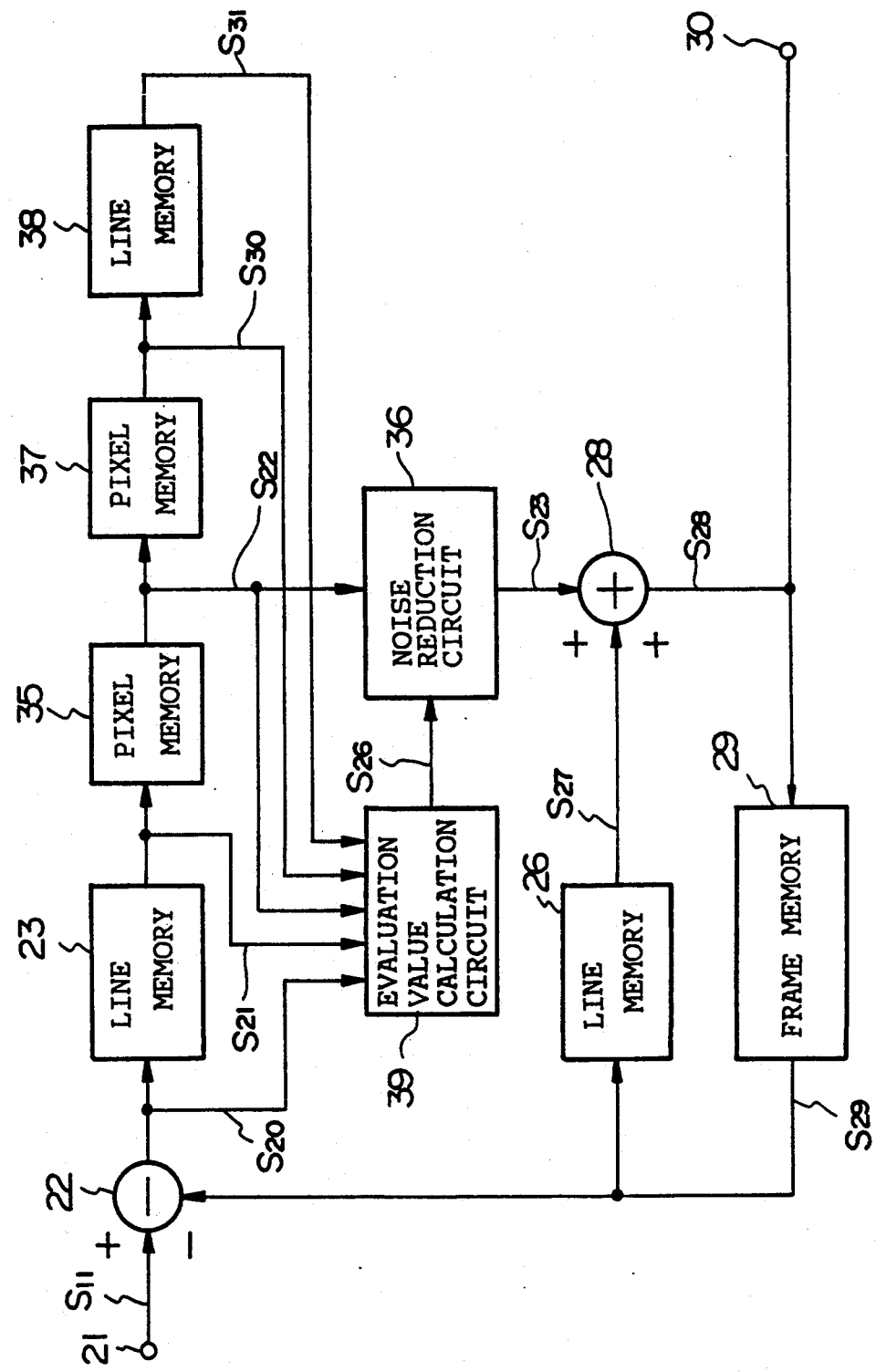
FIG. 3 is a block diagram showing a noise reduction device of the first example in the second embodiment.

FIG. 3 is a block diagram showing a noise reduction device of the second embodiment of this invention, where the symbols of the components correspond to those in FIG. 1. And, FIG. 5 is a conception diagram showing positions of each pixel to explain arrangement of pixels which are elements of evaluation value by the evaluation value calculation circuit of FIG. 3.

Figure 5:
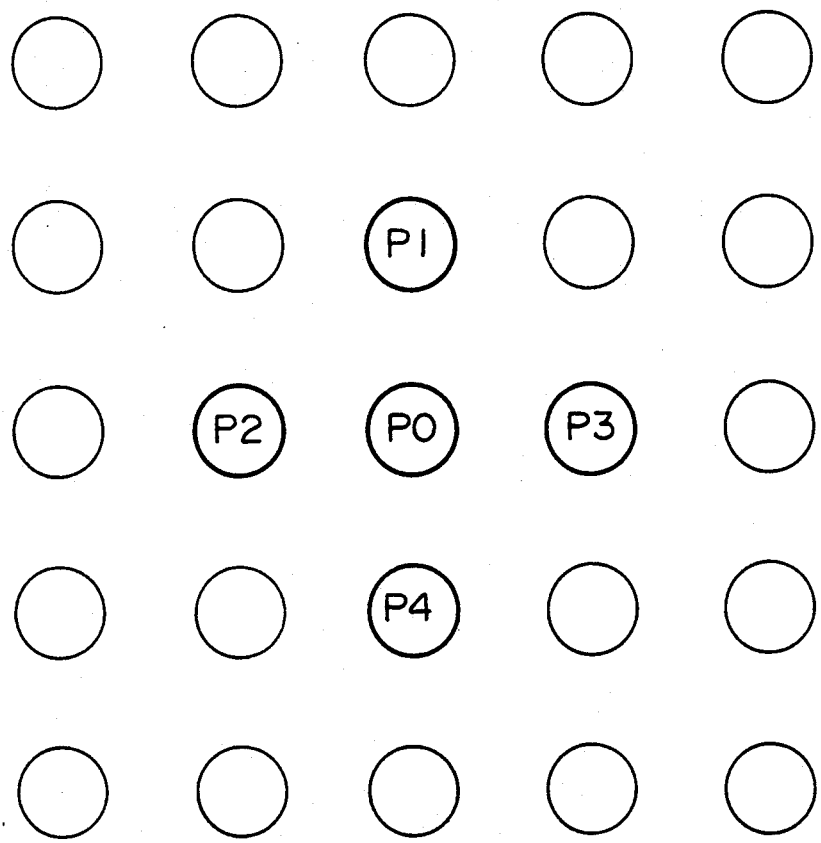
FIG. 5 is conception diagram showing positions of each pixel to explain arrangement of pixels which are elements of evaluation value by the evaluation value calculation circuit of FIG. 3.

In FIG. 5, each circle denotes each pixel, where PO is the target pixel to be suppressed noise, and the neighbor pixels, such as $P_1$, $P_2$, $P_3$ and $P_4$, are utilized noise reduction processing.

In FIG. 3, the subtracter 22 generates an interframe difference signal pixel by pixel by subtracting a previous frame signal S29 which is stored in the frame memory 29, from an original frame signal S11 is input at the input port 21 at first. The difference signal S20 obtained by the subtractor 22 designates a difference of the pixel P4, and is supplied to both the line memory 23 and the evaluative value calculation circuit 39 for motive/static discrimination. The line memory 23 provides the input difference signal S20 with the delay time corresponding to one pixel processing time shorter than one line. The difference signal S21 delayed by the line memory 23 designates a difference of the pixel P3, and is supplied to both the pixel memory 35 and the evaluation value calculation circuit 39. The pixel memory 35 provides the input signal S21 with the delay time corresponding to one pixel processing time. The difference signal S22 delayed by the pixel memory 35 designates a difference of the target pixel PO, and is supplied to the pixel memory 37, the evaluation value calculation circuit 39 and the noise reduction circuit 36. The pixel memory 37 provides the input signal S22 with the delay time corresponding to one pixel processing time just like the pixel memory 35. The difference signal S30 delayed by the pixel memory 37 designates a difference of the pixel P2, and is supplied to the line memory 38 and the evaluation value calculation circuit 39. The line memory 38 provides the imput signal S30 with the delay time corresponding to pixel processing time just like the line memory 23 which has been already explained before. The difference signal S31 delayed by the line memory 38 designates a difference of the pixel P1, and is supplied to the evaluation value calculation circuit 39.

Thus, interframe difference signals S22, S31, S30, S21 and S20 about each pixel P0~P4 are generated by the subtracter 22, and are supplied to the evaluation value calculation circuit 39, where an evaluation value for motive/static discrimination about the target pixel P0 is calculated by using the input signals S22, S31, S30, S21 and S20. And, the absolute values which are summation of each difference signal S22, S31, S30, S21 and S20 are used as evaluation values.

In other words, as the absolute value of the summation, $X_S = |X_0+X_1+X_2+X_3+X_4|$, is calculated, where each $X_0$, $X_1$, $X_2$, $X_3$ and $X_4$ is the difference corresponding with the pixel P1-the difference signal S31, the pixel P2-the difference signal S30, the pixel P3-the difference signal S21, and the pixel P4-the difference signal S20, respectively. After $X_s$ is calculated, this result is compared with the preset threshold or the adaptive threshold dependent of $X_S$ and $|X_0|$ for motive/static discrimination. Then, the evaluated signal S26 is supplied to the noise reduction circuit 36.

The noise reduction circuit 36 provides the noise reduction processing according to the evaluation result about the difference signals S22 which designates a difference of the original target pixel P0. Thus the difference signal S23 about the target pixel P0, which is redacted noise, is supplied to the adder 28. At adder 28, the difference signal S23 is added the output signal S27 of the line memory 26, which signal is delayed signal of the output signal S29 of the frame memory 29 originally. The result signal S28 of the addition is outputted from output port 30, and is also supplied to the frame memory 29 and stored. The delay time by the line memory 26 correponds to the one line processing. The delay time of the signal S22 which is outputted through the line memory 23 and the pixel memory 35 also corresponds to the one line processing. Because the delay times by the evaluation value calculation circuit 39 and the noise reduction circuit 36 are negligible short. The output signal S28 of the adder 28 is delayed corresponding to one line processing, so that the delay time of the frame memory 29 is set one line shorter than one frame.

Accordingly, in the second embodiment of this invention, the absolute value of the summation of the difference values $X_0$, $X_1$, $X_2$, $X_3$, $X_4$ about the target pixel P0, and the neighbor pixels P1~P4 are used as evaluation value to obtain motive/static discrimination of the target pixel P0. Generally, High frequency noise consists of both positive and negative values $X_0$~$X_4$ signals. Therefore, in this embodiments, $|X_0+X_1+X_2+X_3+X_4| < |X_0|+|X_1|+|X_2|+|X_3|+|X_4|$. In other formulation, $$X_s < X_{s1}$$

or $$|X_1+X_2+X_3+X_4| < \max(|X_1|,|X_2|,|X_3|,|X_4|) \times 4,$$

therefore, $$X_{s0} < X_{s2},$$

where $X_{s0} = |X_1+X_2+X_3+X_4|$.

Thus, if the absolute of the summation of each difference value $X_0$~$X_4$ or $X_1$~$X_4$ is used for motive/static discrimination as evaluation value, the threshold for discrimination can be set much smaller than in the case of the first and second prior art, where the difference value $X_{S1}$ (first prior art) or difference value $X_{S2}$ (second prior art) is used as evaluation value.

When this threshold is set relatively small, it is possible for small difference of motion signals to avoid to be discriminated as static signals with high noise reduction effect. As a result, the distortion of small effective motion signal decreases, and a more natural and high quality image can be obtained.

Figure 4:
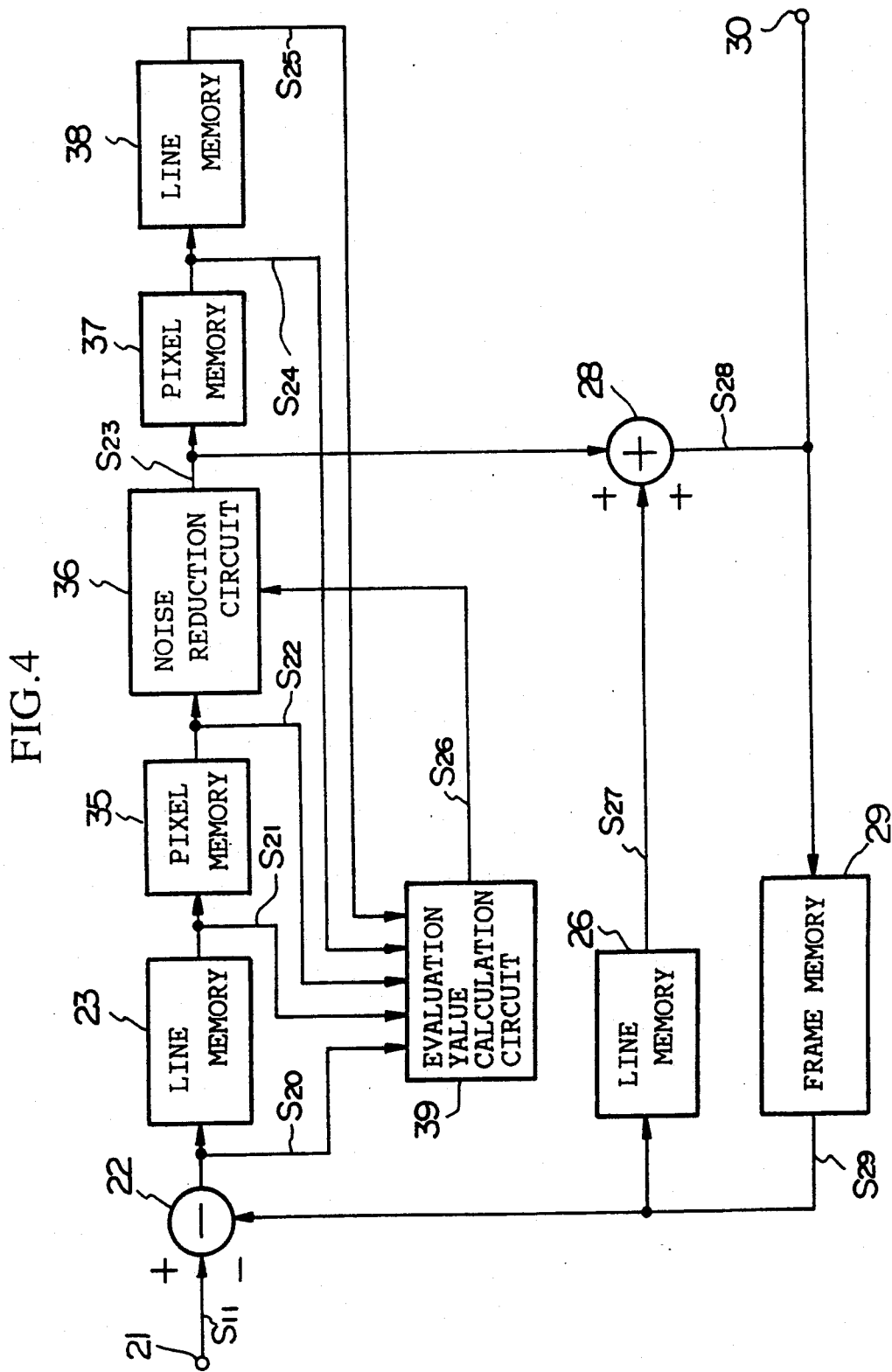
FIG. 4 is a block diagram showing a noise reduction device of the second example in the second embodiment.

On the other hand, FIG. 4 shows a block diagram of the other example of the second embodiment in this invention, where the same symbols are used for corresponding components.

Hereinafter, only different part from the example in FIG. 3 will be explained by using FIG. 4. The output signal S24 of the pixel memory 37 and the output signal S25 of the line memory 38 are supplied to the evaluation value calculation circuit 39 after noise reduction processing by the noise reduction circuit 36. Then the evaluation value calculation circuit 39 calculates $|X_0+X'_1+X'_2+X_3+X_4|$ as evaluation value for motive/static discrimination, where each $X_0$, $X_3$ and $X_4$ is a difference value based on each signal S22, S21 and S20 respectively, and where each $X'_1$ and $X'_2$ is a difference value based on each noise reduced signal S25 and S24 respectively. In this case, as the mentioned above, generally, High frequency noise consists of both positive and negative values of each difference value $X_0$, $X'_1$, $X'_2$, $X_3$ and $X_4$.

Then the similar expression to FIG. 3 is available as follows.

$$X'_s < X_{s1},$$

where $$|X_0+X'_1+X'_2+X_3+X_4| = X'_s,$$

or $$X'_{s0} < X_{s2},$$

where $$|X'_1+X'_2+X_3+X_4| = X'_{s0}.$$

Therefore, equivalent advantage to the former case in FIG. 3 can be obtained by this approach, because smaller thresholds can be set than the cases of conventional technologies.

The line memory 23, 38, the pixel memory 35, 37 and the noise reduction circuit 36 are applicable for the former cases of conventional technologies as they are.

In the described above, only the target pixel P0 and its neighboring pixels P1~P4 have been used as elements of evaluation calculating for the motive/static discrimination, however more neighbor pixels can be used for evaluation value calculation corresponding to more line memories and pixel memories, of course.

Third Embodiment

Figure 6:
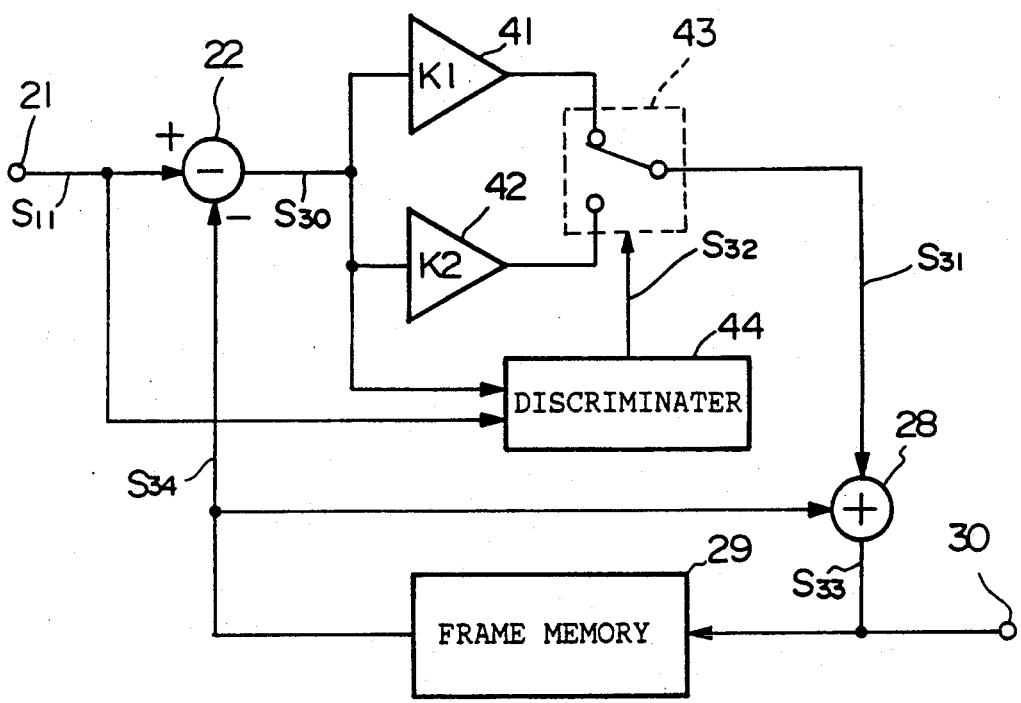
FIG. 6 is a block diagram showing a noise reduction device of the third embodiment.
Figure 10:
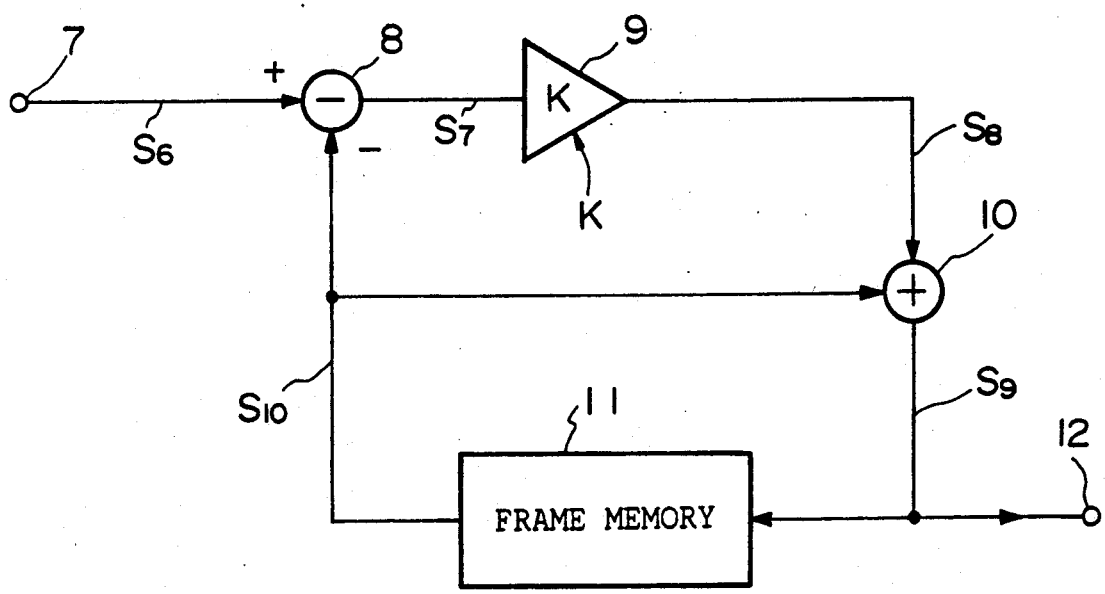
FIG. 10 is a block diagram showing a conventional noise reduction device of the third prior art.

FIG. 6 is a block diagram showing a noise reduction device of the third embodiment in this invention, where the symbols of the components correspond to those in FIG. 10.

The signal S11 inputted from the input port 21 is supplied to the subtracter 22 and the discrimination 44. The subtractor 22 subtracts the output signal S34 of the frame memory 29 from the input signal S11. This difference signal S30 as a result is supplied to the multipliers 41, 42 to be multiplied by the coefficients $K_1$ and $K_2$. The coefficient $K_1$ is not bigger than 1, but is approximate to 1. And, the coefficient $K_2$ is positive and smaller than the coefficient $K_1$.

The output of either the multiplier 41 or the multiplier 42 is selected by the switch 43 according to the discrimination signal S32, which is supplied from the discrimination 44, and is supplied to the adder 28 as the multiplier output signal S31. The adder 28 generates the output signal S33 by adding the mulitplier output signal S31 and the output signal S34 of the frame memory 29, and outputs it to both the frame memory 29 and the output port 30.

Here, when an input signal S11 comes into the input port 21, the discriminator 44 discriminates brightness level of the input signal S11 whether it is bright or dark. At the next stage, the discriminator 44 discriminates polarity of a difference signal S30. In this case, there are four cases as follows.

i) Input signal level: bright (changes from a bright condition to a brighter one)
Difference signal polarity: positive
ii) Input signal level: bright (changes from a bright condition to a darker one)
Difference signal polarity: negative
iii) Input signal level: dark (changes from a dark condition to a bright one)
Difference signal polarity: positive
iv) Input signal level: dark (changes from a dark condition to a darker one)
Difference signal polarity: negative Human vision sensitivity about the distortion called "comet tail" is not a sensitive for case i) and iv), and highly sensitive for case ii) and iii). Therefore, the discriminator 44 outputs the discrimination signal S32 to select the coefficient $K_1$ which is close to 1, in the case of ii) and iii). However, in the case of i) and iv), the discriminator 44 outputs the discrimination signal S32 to select the coefficient $K_2$ which is smaller value than $K_1$. By this means, noise reduction effect can be achieved with the minimum comet tail distortion.

In the above-mentioned example, two multiplication coefficients $K_1$, $K_2$ have been used, however it is possible to increase the coefficients by dividing brightness into more levels, and considering how much difference signals change in addition to polarity, of course. The variable coefficient multiplier, where K is set by the discriminator 44, is also realized by using the multiplier 9 in FIG. 10 in order to increase coefficients. Then the switch 43 can be omitted.

What is claimed is:

1. A noise reduction device including:
a first subtracter means for obtaining a first difference between an current frame signal and a previous frame signal pixel by pixel;
a first line memory means for outputting said first difference with a delay time corresponding to at least one line processing time;
an average value calculation means for calculating an average value of said first difference which is in a preset range, on at least one line of pixels;
a second subtracter means for obtaining a second difference between an output of said first line memory means and an output of said average value calculation means pixel by pixel;
a non-linear means for suppressing said second difference smaller than a preset value;
a second line memory means for outputting said previous frame signal with a delay time to output at same timing with output of said non-linear means;
an adder means for adding an output of said non-linear means and an output of said second line memory means pixel by pixel; and
a frame memory means for memorizing an output of said adder means, and for outputting said previous frame signal, which is memorized therein, to said first subtracter means and said second line memory means.

2. A noise reduction device including:
a subtracter means for obtaining a first difference between an current frame signal and a previous frame signal pixel by pixel;
a plural pixel frame memory for obtaining second differences of a target pixel for noise reduction and of neighboring pixels of said target pixel, based on said first difference;
an evaluation value calculation means for calculating absolute values of summation of said first difference and said second differences, as evaluation value for determining a noise reduction characteristic; and
a noise reduction means for suppressing noise including said first and second differences of pixels based on said noise reduction characteristic.

3. A noise reduction device including:
a subtracter means for obtaining a first difference between an current frame signal and a previous frame signal pixel by pixel;
first pixel memory means for obtaining second differences of a part of pixels which are a target pixel for noise reduction and neighboring pixels of said target pixel, based on said first difference;
noise reduction means for suppressing noise including said first differences based on an evaluation value for determining a noise reduction characteristic;
second pixel memory means for obtaining reduced differences, by said noise reduction means, of rest part of said pixels which are a target pixel for noise reduction and neighboring pixels of said target pixel based on said first difference;
an evaluation value calculation means for calculating absolute values of summation of said noise reduced differences from said second pixel memory means and said first and second differences of at least each neighboring pixel, as said evaluation value for determining said noise reduction characteristic.

4. A method for reducing noise of image signal, comprising steps of:
obtaining a difference signal between a input image signal which is a current frame signal and a memorized signal which is a previous frame signal pixel by pixel;
obtaining a multiplication coefficient which is smaller than 1, in case of the brightness of image designated by said current frame signal has been changing toward the brighter when said brightness is bright, and in case of that said brightness has been changing toward the darker when said brightness is dark, on the basis of said input image signal and said difference signal,
however, obtaining a multiplication coefficient which is less than 1 and is larger than said multiplication coefficient, in case of that said brightness has been changing toward the darker when said brightness is bright, and in case of that said brightness has been changing toward the brighter when said brightness is dark, on the basis of said input image signal and said difference signal;

obtaining a mulitple signal by multiplying said difference signal by said multiplication coefficient;

obtaining summation of said memorized signal and said mulitple signal;

then storing said summation as a memorized signal for input image signal of next frame, and outputting said summation as final output image signal at the same time.

5. A noise reduction device including:

a subtracter means for obtaining a difference signal imput image signal which between an is a current frame signal and a memorized signal which is a previous frame signal;

discriminator means for discriminating that said difference is multiplied a multiplication coefficient which is smaller than 1, in case of that brightness of image designated by said current frame signal has been changing toward the brighter when said brightness is bright, and in case of that said brightness has been changing forward the darker when sid brightness is dark, on the basis of said input image signal and said difference signal, however, that said difference is mulitplied a mulitplication coefficient which is less than 1 and is larger than said multiplication coefficient which is smaller than 1, in case of that said brightness has been changing toward the darker when siad brightness is bright, and in case of that said brightness has been changing toward the brighter when said brightness is dark, on the basis of said input image signal and said difference signal;

mulitplier means for obtaining a multiply signal by multiplying said difference signal by said multiplication coefficient according to said discriminating;

adder means for obtaining an output image signal by adding said memorized signal and said multiply signal; and frame memory means for storing said output image signal, and for outputting said output image signal memorized therein as said memorized signal for next frame.

* * * * *